ing track which is journalled on a hollow shaft against
United States Patent

Brealey

[15] 3,694,616
[45] Sept. 26, 1972

[54] METHOD OF SECURING A BEARING RACE BY WELDING USING HEAT

[72] Inventor: Edward Reginald Brealey, Derby, England

[73] Assignee: Rolls-Royce Limited, Derby, England

[22] Filed: Nov. 3, 1970

[21] Appl. No.: 86,581

[30] Foreign Application Priority Data

Nov. 26, 1969 Great Britain..........57,807/69

[52] U.S. Cl.........................219/121 EB, 287/52.07
[51] Int. Cl. .............................................B23k 15/00
[58] Field of Search........219/121, 121 EB; 29/474.3, 29/473.3, 471.1, 498, 148.4 A, 149.5 B; 308/256; 287/52.07

[56] References Cited

UNITED STATES PATENTS

| | | | |
|---|---|---|---|
| 3,562,888 | 2/1971 | Settle | 219/121 EM X |
| 3,250,581 | 5/1966 | Honroth | 29/148.4 A X |
| 2,536,784 | 1/1951 | Tamm | 29/148.4 A X |
| 3,458,683 | 7/1969 | Canonico et al. | 219/121 E |
| 2,308,307 | 1/1943 | Robinson | 29/471.1 X |
| 3,245,273 | 4/1966 | Coper et al. | 287/52.07 |
| 3,203,268 | 8/1965 | Manoni et al. | 287/52.07 |
| 3,185,815 | 5/1965 | Anderson | 219/121 EB |
| 1,810,028 | 6/1931 | Paszkowski | 287/52.07 |
| 1,840,926 | 1/1932 | Williams | 287/52.07 |
| 3,460,237 | 8/1969 | McClintock | 29/474.3 |
| 3,512,612 | 5/1970 | Bragg et al. | 219/121 EB |

*Primary Examiner*—J. V. Truhe
*Assistant Examiner*—Gale R. Peterson
*Attorney*—Stevens, Davis, Miller & Mosher

[57] ABSTRACT

The invention concerns a method of securing a bearing track which is journalled on a hollow shaft against rotational movement relative to the shaft. The bearing inner track is journalled against a step on the shaft and abutted by a retaining collar mounted on the shaft. An electron beam is applied to the bore of the shaft in a radial direction to penetrate firstly the shaft wall and then the retaining collar to weld them together so that a residual axial compressive load is produced sufficient to hold the bearing track against rotation relative to the shaft.

4 Claims, 2 Drawing Figures

INVENTOR
EDWARD REGINALD BREALEY

A METHOD OF SECURING A BEARING RACE BY WELDING USING HEAT

In an assembly comprising an annular ring such as a bearing race journalled on a hollow shaft it is the common practice to secure the bearing race against movement relative to the shaft by compressing it against a step or other form of stop on the shaft by means of a nut engaging with a threaded portion of the shaft, a lock washer being interposed between the nut and the bearing race to prevent the nut from rotating loose.

In this invention we propose another method of securing an annular ring such as a bearing inner race against movement relative to the shaft. The proposed method could likewise be used to secure against movement relative to the shaft a disc or gear which is journalled or splined or otherwise mounted on the shaft.

In or for an assembly of a hollow shaft member and an annular member mounted on the shaft member abutting a stop on the shaft member, there is provided according to the invention a method of welding said members together comprising the step of directing a concentrated beam of heat energy substantially radially of the shaft member to penetrate firstly the shaft member and then the annular member to weld said members together so that a force is produced in the assembly after welding which urges the annular member towards the stop.

In a preferred embodiment of the invention the annular member is a retaining collar mounted on the shaft to abut an inner track of a roller bearing which is journalled on the shaft against a step on the shaft. An electron beam is applied to the bore of the shaft in a substantially radial direction to penetrate firstly the shaft wall and then the retaining collar to weld the shaft and retaining collar together so that a residual axial compressive load is produced sufficient to hold the bearing inner track against rotation relative to the shaft.

The method of securing an annular ring such as a bearing race against movement relative to the shaft as proposed by this invention has an advantage over the aforementioned known method in that it can be used in assemblies where lack of space precludes using a nut on a threaded portion of the shaft.

One embodiment of the invention will now be described, by way of example only, with reference to the accompanying drawings.

Figure 1:
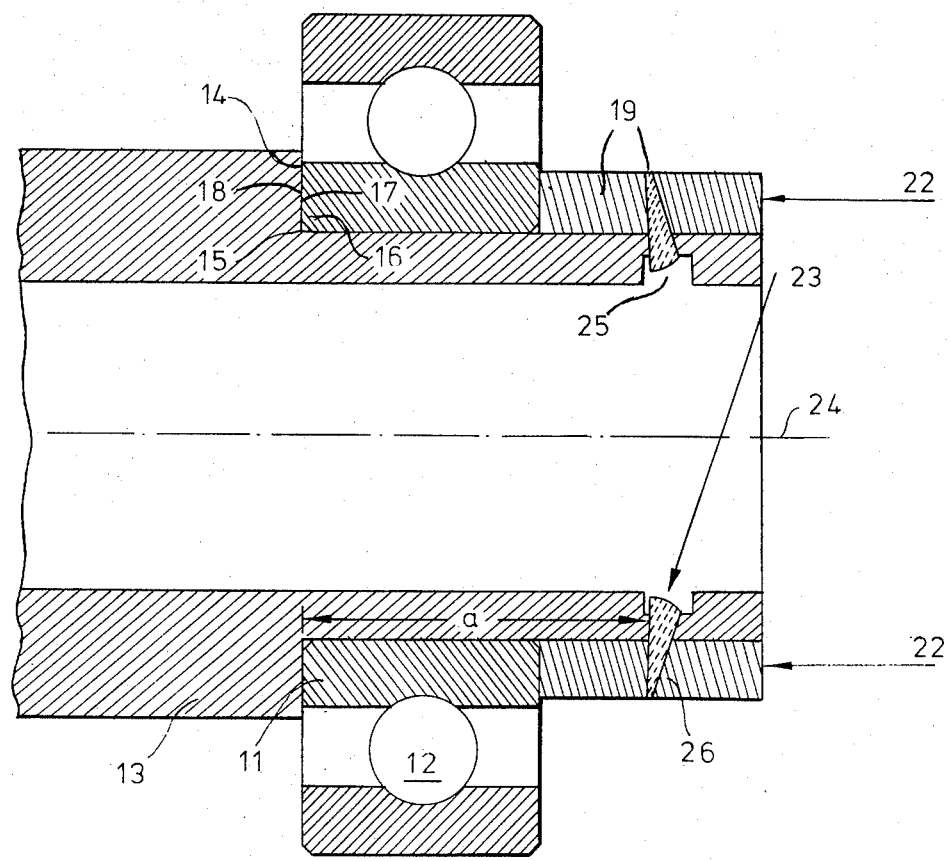
FIG. 1 is a longitudinal sectional view of a roller bearing journalled on a hollow shaft.

In the FIG. 1 an inner race 11 of a roller bearing 12 is journalled on a hollow shaft 13 against a step 14 on the shaft. A retaining collar 19 is mounted on the shaft and compressed firmly during assembly against the bearing inner race by an axial load, indicated by arrows 22, from an external source which is not shown, during welding of the collar 19 into place on the hollow shaft 13.

The fillet 15 of the step 14 is of a smaller radius than the adjacent rounded chamfer 16 on the bearing inner race in order that the end face 17 of the bearing inner race can abut the flat face 18 of the step 14.

The retaining collar 19 is welded to the shaft by means of an electron beam, indicated by the numeral 23 in the drawing, applied in a substantially radial direction relative to the axis 24 of the shaft 13. The electron beam is directed into a circumferential groove 25 in the bore of the shaft and welding is effected all around the groove 25 by rotating the shaft around its axis 24. The electron beam penetrates completely through the shaft wall and the retaining collar 19 to produce a substantially radial annular weld 26 securing the retaining collar to the shaft. The welding operation causes expansion on heating followed by contraction on cooling in the welded parts normal to the line of the weld. The expansion and contraction are proportional to the amount of heat dissipated and are therefore proportional to the width of the weld, that is to say, to the dimension of the weld in the direction parallel to axis 24. The mean width of the weld in the shaft wall is greater than the mean width of the weld in the retaining collar and thus the expansion and contraction of the shaft in the axial direction are greater than the expansion and contraction of the retaining collar in the axial direction.

Thus, on cooling the contraction in the shaft over length $a$ (between the weld 26 and face 18) will be greater than the contraction in collar 19 and inner race 11 over the same length $a$ because more heat will have been dissipated in the shaft. After the external load 22 is removed from the collar the bearing inner track will be left permanently compressed between the step 14 and the retaining collar 19. This compression is balanced by an axial tension in the shaft wall.

When it is necessary to replace the roller bearing the retaining collar is machined off. The groove 25 is then recut in the bore of the shaft. A new roller bearing is journalled on the shaft and a new retaining collar mounted and welded to the shaft as already described.

Figure 2:
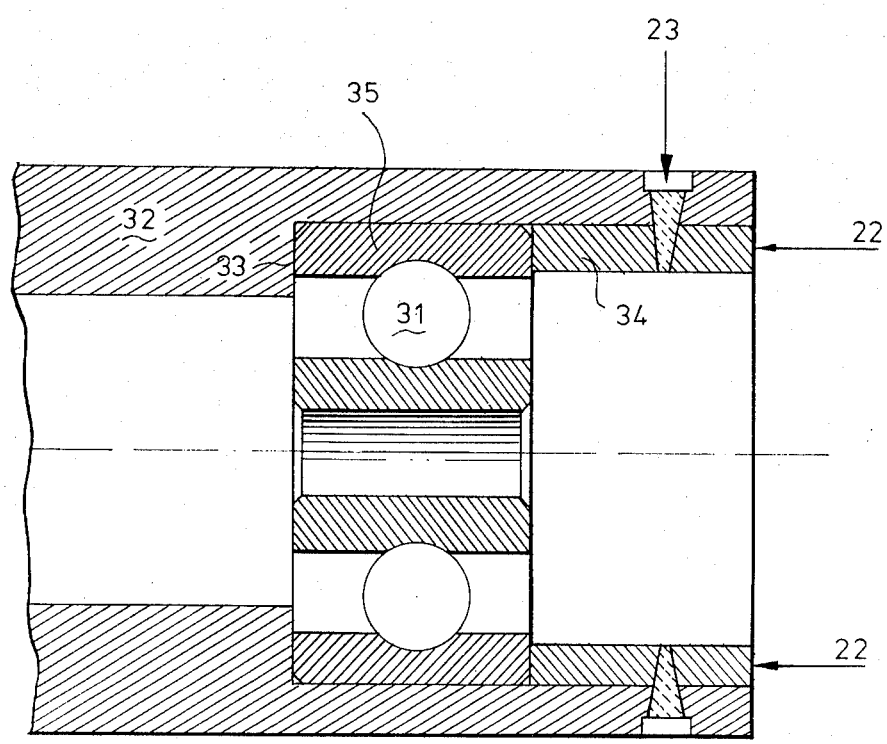
FIG. 2 is a longitudinal sectional view of a roller bearing journalled in the bore of a hollow shaft.

In FIG. 2 the bearing 31 is journalled in the bore of the shaft 32 against an internal shoulder or step 33 and the retaining collar 34 is mounted in the bore and held abutting the outer race 35 of the bearing 31 by an external load indicated by arrows 22. The bearing outer track 35 is compressed between the step 33 and the retaining collar 34 to prevent movement of it relative to the shaft by an electron beam weld from a beam 23 applied round the outer periphery of the shaft 32 to penetrate the shaft wall and the retaining collar 34 in a substantially inward radial direction to weld them together and produce a residual compression load in the bearing outer race 35.

We claim:

1. A method for securing a bearing race on a hollow shaft having a stop formed on the external surface thereof against rotational movement with respect to said shaft, comprising the steps of:

mounting said bearing race externally on said shaft abutting said stop;

mounting a retaining collar externally on said shaft in abutting engagement with said bearing race;

applying an external force to said collar in the direction of said bearing race;

directing a concentrated beam of heat energy substantially radially outwardly of the longitudinal axis of said shaft;

penetrating first said shaft and then said collar with said concentrated beam to weld said shaft and collar together; and maintaining said applied external force during said welding step to maintain said bearing race in abutting engagement with said stop;

wherein, after completion of said welding step said shaft and collar contract by different amounts to urge said collar and said bearing race towards said stop.

2. An article made by the method of claim 1.

3. A method for securing a bearing race on a hollow shaft having a stop formed on the internal surface thereof against rotational movement with respect to said shaft, comprising the steps of:

mounting said bearing race internally on said shaft abutting said stop;

mounting a retaining collar internally on said shaft in abutting engagement with said bearing race;

applying an internal force to said collar in the direction of said bearing race;

directing a concentrated beam of heat energy substantially radially inwardly of the longitudinal axis of said shaft;

penetrating first said shaft and then said collar with said concentrated beam to weld said shaft and collar together; and maintaining said applied internal force during said welding step to maintain said bearing race in abutting engagement with said stop;

wherein, after completion of said welding step said shaft and collar contract by different amounts to urge said collar and said bearing race towards said stop.

4. An article made by the method of claim 3.

* * * * *